Nov. 22, 1949     R. D. ACTON     2,488,698
IMPLEMENT CONSTRUCTION

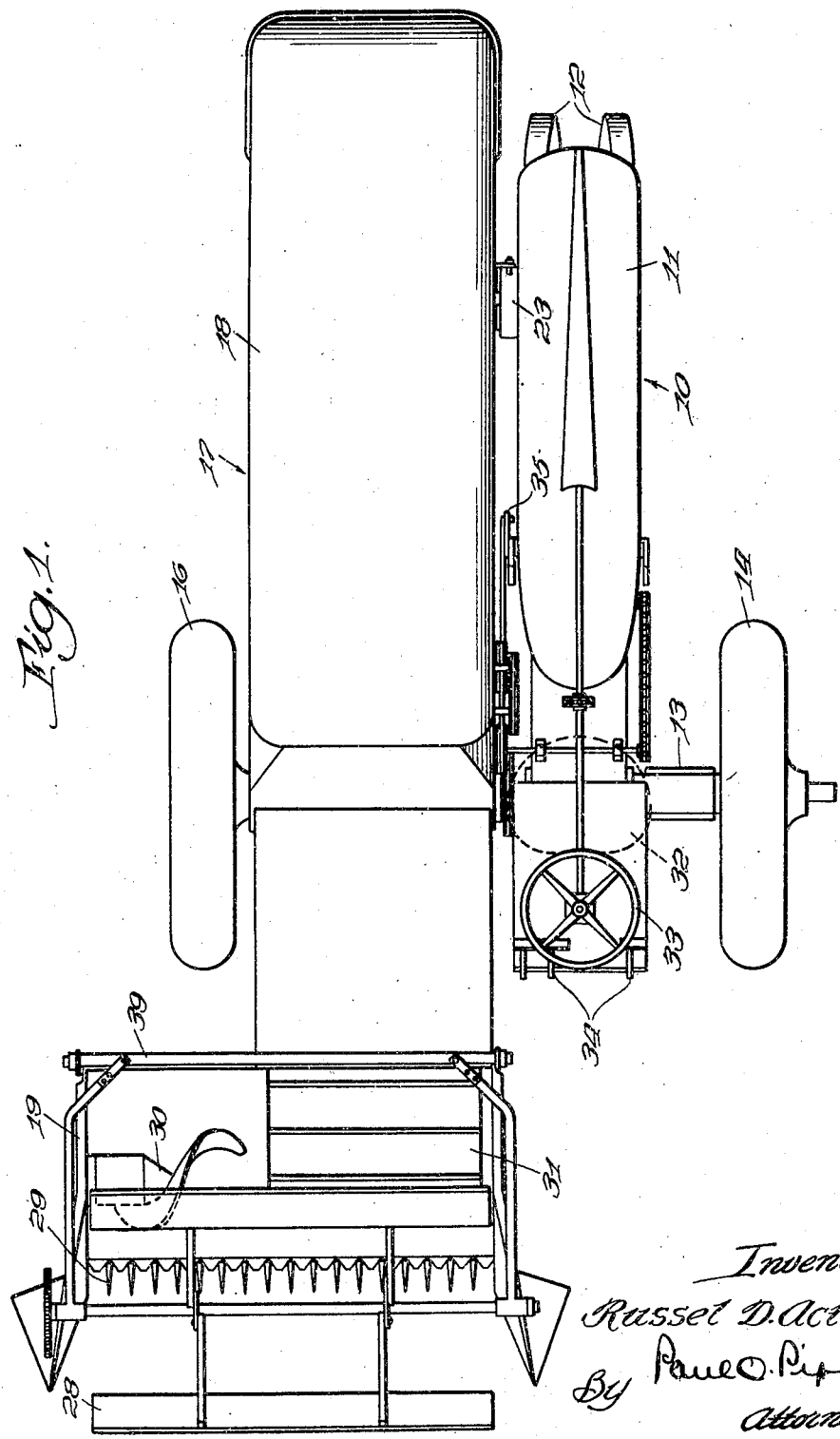

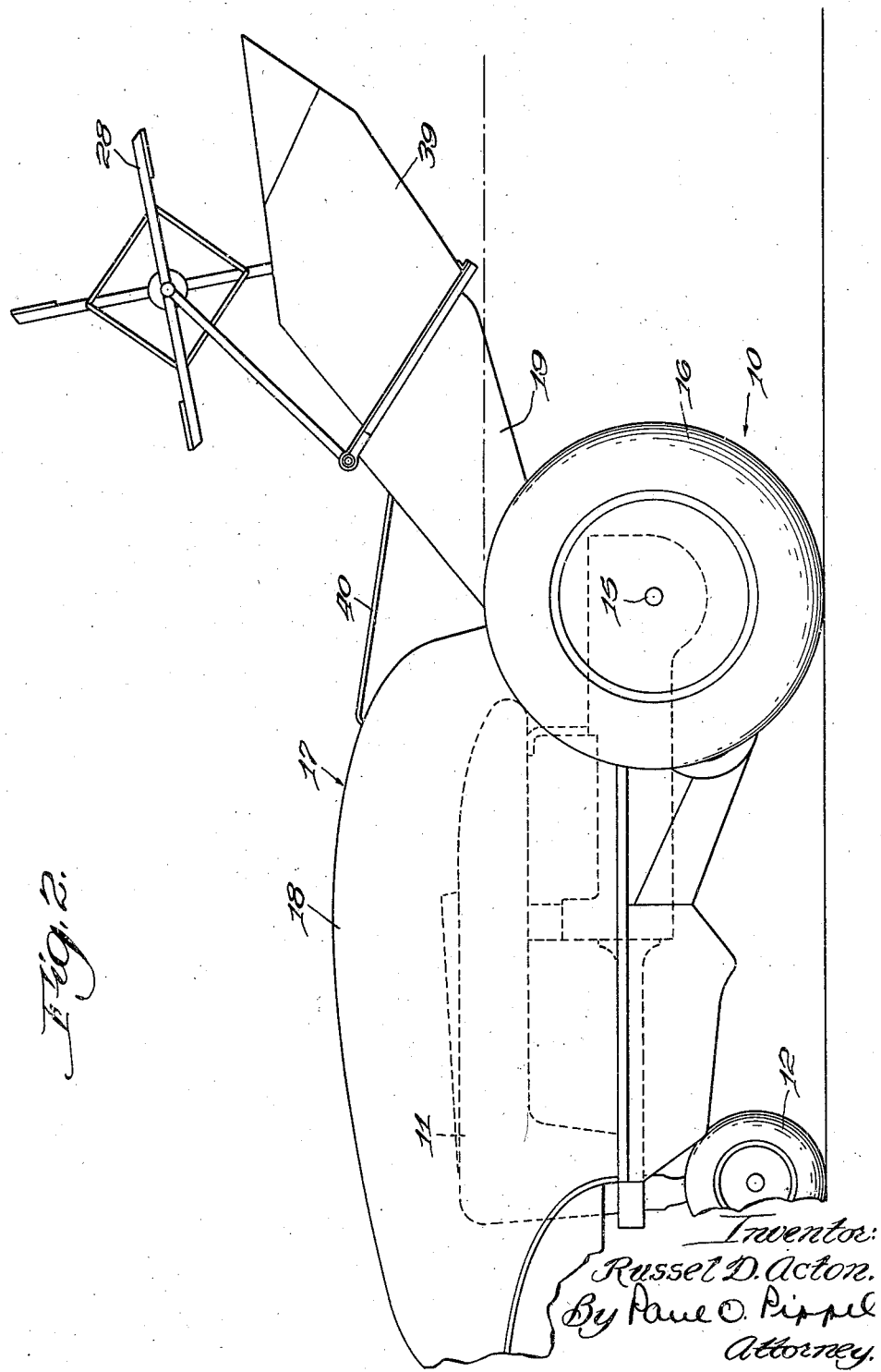

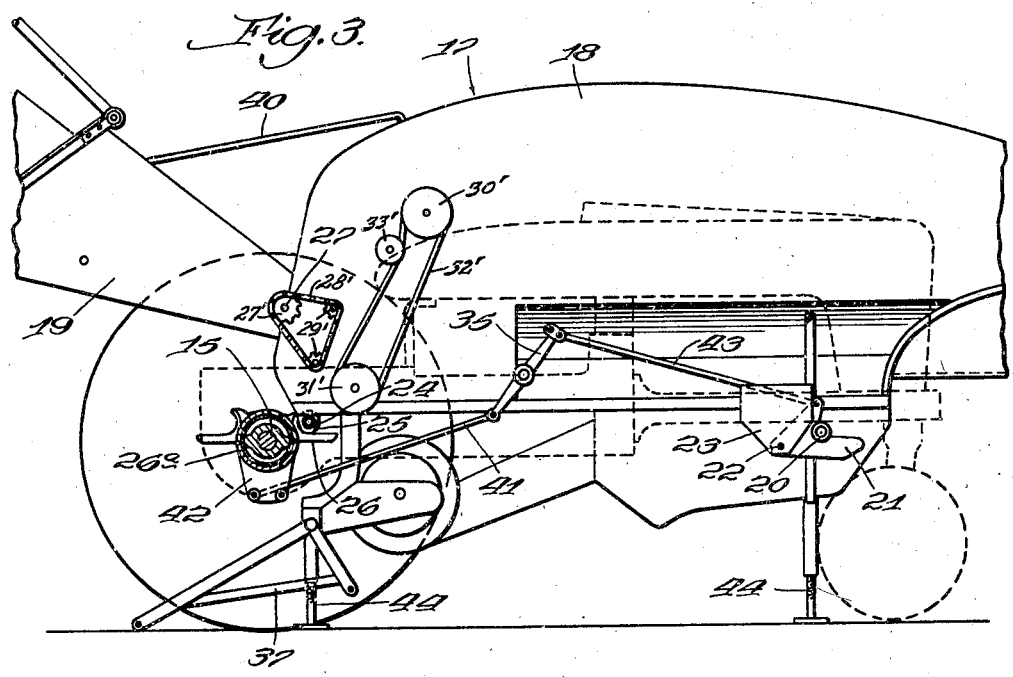
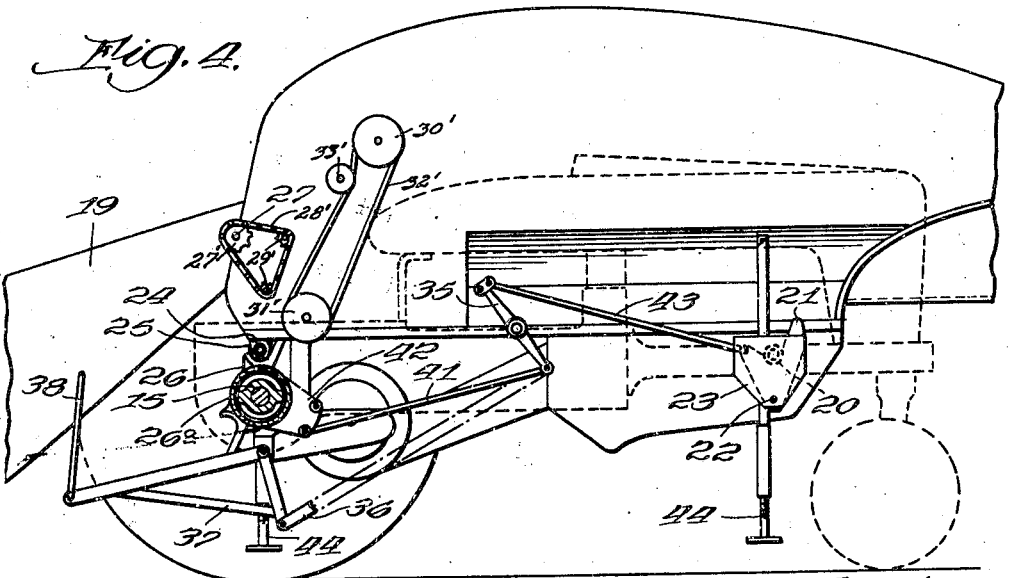

Filed April 21, 1945     4 Sheets-Sheet 4

Inventor:
Russel D. Acton.
By Paul O. Pippel
Atty.

Patented Nov. 22, 1949

2,488,698

UNITED STATES PATENT OFFICE 2,488,698

IMPLEMENT CONSTRUCTION

Russel D. Acton, Chicago, Ill., assignor to International Harvester Company, a corporation of New Jersey Application April 21, 1945, Serial No. 589,559

1 Claim. (Cl. 56—21)

1

This application is a continuation-in-part of my copending application Serial No. 490,266, filed June 10, 1943 now abandoned.

This invention relates to the arrangement of an implement upon a tractor for ready removal from the tractor. More specifically, it relates to the arrangement of parts of a harvester-thresher mounted upon a tractor.

Self-propelled devices such as harvester-threshers are known, but in most cases the propelling means or tractor is inseparably connected to the device so that the tractor cannot be used for other purposes. In cases where a device such as a harvester-thresher is separably connected to a tractor, the device is so arranged with respect to the tractor that the tractor runs forwardly. This causes the mounting structure for the device upon the tractor to be costly and complicated. The present invention has to do with the association of the device with a tractor in such a way that the tractor runs backwardly for operation of the device. This permits the mounting to be simplified. The present application has to do with the arrangement of parts of a harvester-thresher with respect to one another so that detachment from the tractor is facilitated.

An object is to provide an improved tractor-mounted implement.

Another object is the provision of improvements in a tractor-mounted device comprising crop-gathering means and crop-treating means.

A further object is to provide improvements in a tractor-mounted harvester-thresher.

Still another object is the provision of an improved arrangement of parts of an implement such as a harvester-thresher that will facilitate detachment of the implement from the tractor.

Other objects will appear from the disclosure.

According to the present invention, a harvester-thresher composed of a thresher and a harvester part is mounted upon a tractor of the tricycle type in such a way that the thresher part extends along the tractor body within the tractor wheel line with the rear end of the thresher part adjacent the front end of the tractor body and the front end of the thresher part adjacent the tractor rear axle, and the harvester part is pivotally connected to the thresher part adjacent the rear axle and extends downwardly and rearwardly to the rear of the rear axle and laterally beyond one of the tractor wheels. For operation of the harvester thresher the tractor is run backwards. The harvester-thresher is detachably connected to the tractor so that it may be removed therefrom, and the tractor may be used for other purposes while being run forwardly in the normal manner. Another significant feature of the present invention is raising the harvester part sufficiently so that, when the harvester-thresher is detached from the tractor and the tractor is moved away from the harvester-thresher, the harvester part will clear the tractor rear axle and wheels.

In the drawings:

Figure 1 is a plan view of a tractor and a harvester-thresher mounted thereon;

Figure 2 is a side view of the tractor and the harvester-thresher with the harvester part thereof in raised position;

Figure 3 is substantially a vertical longitudinal section taken between the implement and the tractor looking in the direction of the implement with the removed portion of the tractor shown in phantom and showing the implement dismounted; and Figure 4 is a similar view, with parts omitted, showing the tractor and harvester-thresher in mounted position upon the tractor;

Figure 5:
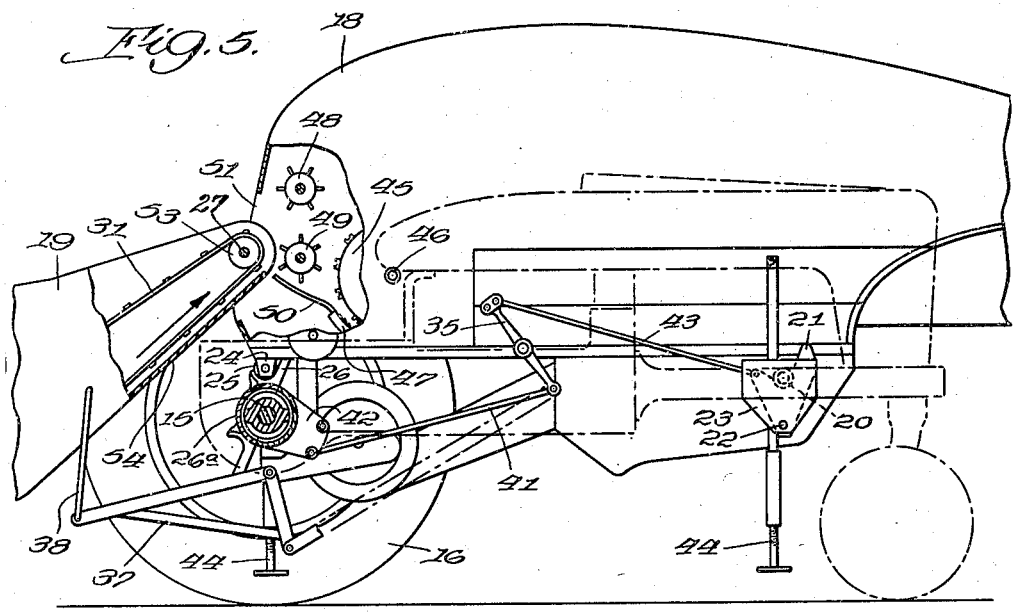
Figure 5 is a view similar to Figure 4 with a portion of both the harvester and thresher parts broken away to show the delivery of material from the harvester part to the thresher part.

Reference character 10 designates a tractor having a narrow body 11, a narrow steerable front rolling support 12, and a transverse rear drive-axle structure including a short right-hand rear axle 13, a wheel 14 connected thereto, an extended left-hand rear axle 15, and a wheel 16 connected thereto, whereby the major portion of the weight of the tractor is carried on the wheel at the short axle side of the tractor. Said tractor is adapted to operate in the reverse direction with the drive axle leading and the steerable support trailing. There is mounted upon the tractor at the extended axle side an implement in the form of a harvester-thresher 17 comprising essentially a thresher part 18 and a harvester part 19. The thresher part 18 is supported with its straw-discharging end adjacent the normal front end of the tractor body 11, this end of the thresher part being the rear end when the tractor is operated in reverse direction, and its other and crop-receiving end on the left-hand rear axle 15 whereby the major portion of the harvester-thresher is carried on the tractor at the extended axle side. The rear end of the thresher part 18 has a roller 20 carried on a lifting member 21 pivotally mounted at 22 on a bracket 23 secured to the tractor body 11 near the front end thereof. The under side of the front of the thresher part 18 carries brackets 24 (only one being shown) supporting rollers 25 (only one being shown) resting in lifting members 26 (only one being shown) secured to a sleeve 26ᵃ mounted upon the left-hand rear axle 15. The harvester part 19 is pivotally connected to the thresher part 18 on an axis represented by a shaft 27 at the front end of the thresher part 18 directly over the rear axle 15. A sprocket 27' mounted on the shaft 27 drives a chain 28' which engages a pair of sprockets 29' carried on the thresher body. This structure forms a portion of a conventional drive for the operating parts of the harvester thresher. Belt pulleys 30' and 31' drive a belt 32' which also engages an idler sprocket 33'. This driving construction also forms a part of the drive mechanism for the thresher part. The harvester part includes a reel 28, a reciprocating cutter 29, an auger feed 30, and a canvas conveyor 31. Said conveyor delivers the harvested crop upwardly and rearwardly and over the drive-axle structure of the tractor, the portion of the crop-treating or thresher part 18 adjacent and above the drive-axle structure being adapted to receive said crop. The tractor 10 has a seat 32, a steering wheel 33, and control members 34, all of which enable the tractor to be run rearwardly for the normal operation of the harvester-thresher 17, which is gathering crops by the harvester part 19 and threshing them by the thresher part 18.

When the harvester-thresher 17 is to be detached from the tractor 10, the lifting means fully shown and claimed in the copending application of Hitchcock et al., Serial No. 490,267, filed June 10, 1943, now Patent No. 2,376,539 is employed. Before the harvester-thresher 17 is detached, an operation must be performed that forms one feature of the present invention. This operation is the moving of the harvester part so that it does not interfere with removal of the thresher part. In the embodiment illustrated this movement consists of the raising of the harvester part 19 from the working position of Figure 4 in which it extends downwardly and rearwardly from its pivot point on the thresher part 18 represented by the shaft 27 to the position of Figures 2 and 3, in which it extends upwardly from a pivot on the shaft 27 sufficiently to clear the axle 15 and the wheel 16 and all longitudinally aligned parts of the tractor body. During normal operation of the harvester-thresher, the harvester part 19 may be adjusted in the position shown by a power member 35 actuated by the usual power plant of the tractor 10, not shown, which power member acts through link 36, bell-crank 37, and link 38 upon the harvester part 19. When the harvester part 19 is to be raised, the link 38 is disconnected therefrom, and the harvester part is lifted in any desired manner to the position shown in Figure 3 in which it extends somewhat upwardly from its pivot on the thresher part 18, and a portion 39 thereof extending outwardly beyond the tractor wheel 16 is above the wheel 16 so as to clear it when the tractor 10 is backed away from the harvester-thresher 17. The harvester part 19 is held in its raised position by a bail 40 connecting the harvester part 19 to the top of the front end of the thresher part 18. Then a link 41 is connected with the power member 35 and with a flange 42 secured to the mounting sleeve 26ᵃ. A link 43 is connected to the power member 35 and to the lifting member 21. Then the harvester-thresher is lowered from the position of Figure 4 to that of Figure 3 by the action of the power member 35. Feet 44 support the harvester-thresher in the detached position of Figure 3. After the harvester-thresher 17 has been detached, as shown in Figure 3, the tractor may be backed away from it. It will be noted that the thresher part 18 is so constructed and arranged with respect to the tractor that no part thereof overlies or underlies the tractor body sufficiently close thereto in a vertical direction to engage said body and thereby interfere with the necessary vertical movement of the thresher part during attaching the detaching. It will also be noted that said thresher part is so constructed and arranged that no portion thereof extends laterally in such overlapping relation with respect to the traction wheel at the harvester-thresher side of the tractor body as to engage and interfere with the longitudinal movement of the thresher part relative to the tractor necessary for attaching and detaching. For attachment of the harvester-thresher 17 to the tractor 10, the aforementioned operations are reversed. The power member 35 acts to move the lifting members 25 and 26 angularly to raise the harvester-thresher 17 to raised position. Then the bail 40 is disconnected, and the harvester part 19 is lowered from the raised position of Figures 2 and 3 to the lowered working position of Figure 4.

Figure 5 shows the construction of Figure 4 which bears the same reference characters in so far as the same parts are shown. Figure 5 is additionally broken away in section at the junction point of the pivoted harvester part 19 with the thresher part 18 to show additional structure.

The thresher part 18 has the usual threshing cylinder 45 carried by a shaft 46. A portion of a concave 47 is also visible, said concave underlying the cylinder. An upper feed roll 48 cooperates with a lower feed roll 49 to feed material to the threshing cylinder. A deflector plate 50 is shown underneath the feed roll 49 for assuring the delivery of material between the threshing cylinder 45 and the concave 47. An opening 51 is provided at the front portion of the thresher part 18. It will be noted that said opening is above the tractor axle structure whereby material may be delivered over said axle structure into the thresher mechanism.

The harvester part 19, in addition to the adjusting structure including the link 38 previously described, is pivotally carried on the shaft 27. Said shaft also provides a support for a rotatable member 53 which carries and drives the feed apron 31. Said feed apron cooperates with the bottom wall 54 of the harvester part to deliver harvested material upwardly and rearwardly above the rear axle structure of the tractor into the receiving opening 51 of the thresher part.

Figure 6:
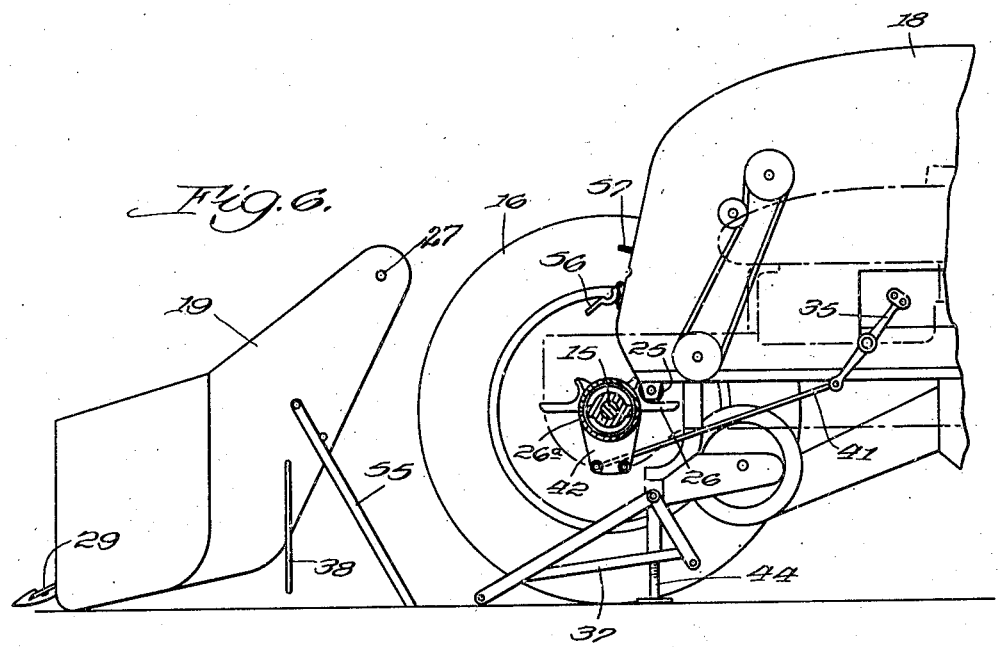
Figure 6 is a view similar to Figure 3 showing a modified construction in which the harvester part is moved out of interfering position with respect to the tractor parts for removal of the implement from the tractor by separately disconnecting and removing the harvester part.

Figure 6 illustrates a modified means of removing the harvester from the tractor by first removing the harvester part 19 from the thresher part 18. Figure 6 shows the implement in its removed position from the tractor and supported by the feet 44. The harvester part 19 is also shown as removed from the tractor, being supported by struts, one of which, 55, is shown, and removable clamping means is illustrated including a swingable member 56 and a securing element 57. The member 56 is adapted to clamp over a portion of the shaft 52 for pivotally securing the harvester part 19 to the thresher part.

In removing the implement, as shown in the modification of Figure 6, the harvester part 19 is first removed and supported on the ground following which the tractor is driven into a position where it can be driven in the direction of the traction wheels away from the thresher part 18 after said thresher part has been supported on the ground as shown in Figure 6.

It will be apparent from the foregoing description that there has been provided by the present invention a tractor-implement combination and also means to perform an operation for facilitating removal of an implement such as a harvester-thresher from a tractor. This operation comprises raising the harvester part of the harvester-thresher sufficiently to clear the rear axle and wheel of the tractor so that, when the harvester-thresher is detached from the tractor, the tractor may be backed away from the harvester-thresher without interference between the harvester part and the wheel and axle of the tractor. The invention has been illustrated as applied to a harvester-thresher, but it will be obvious that it may be applied to other types of tractor-mounted devices.

The intention is to limit the invention only within the scope of the appended claim.

What is claimed is:

A harvester thresher having a harvester part and a thresher part in which the thresher part includes a relatively long narrow high body and the harvester part is relatively wide, means pivotally connecting the harvester part to said thresher part near the top thereof, said harvester thresher adapted to be mounted and removed from a standard tricycle type farm tractor having an axle normally disposed lower than said pivotal connection, means operatively connected to the thresher part and the tractor for connecting the thresher part to the tractor for mounting thereon, and removable connecting means carried on one of said parts for joining the harvester part and thresher part in a manner in which the harvester part is swung upwardly about its pivotal connection whereby the harvester thresher may be mounted and removed from the tractor as a unit by driving the tractor with its axle under the harvester part without disassembling the harvester part from the thresher part because the wide harvester part is thus held in an up out-of-the-way position.

RUSSEL D. ACTON.

REFERENCES CITED

The following references are of record in the file of this patent:

UNITED STATES PATENTS

| Number | Name | Date |
|---|---|---|
| 2,259,893 | Hyman | Oct. 21, 1941 |
| 2,264,565 | Coultas et al. | Dec. 2, 1941 |
| 2,347,871 | Andrews et al. | May 2, 1944 |
| 2,369,745 | Millard et al. | Feb 20, 1945 |
| 2,376,539 | Hitchcock et al. | May 22, 1945 |